Nov. 17, 1959     D. W. COX, JR     2,913,196
VERTICAL TAKE-OFF AIRPLANE
Filed Feb. 10, 1955

INVENTOR
DALE W. COX JR.
BY
ATTORNEYS

United States Patent Office 2,913,196
Patented Nov. 17, 1959

2,913,196

VERTICAL TAKE-OFF AIRPLANE

Dale W. Cox, Jr., United States Navy

Application February 10, 1955, Serial No. 487,480

4 Claims. (Cl. 244—15)

(Granted under Title 35, U.S. Code (1952), sec. 266)

The invention described herein may be manufactured and used by or for the Government of the United States of America for governmental purposes without the payment of any royalties thereon or therefor.

The present invention relates to a vertical take-off aircraft, and more particularly to such an aircraft for one person in which the body portion serves as an airfoil, and in which the engine is placed to the rear of the pilot.

An object of the present invention is to provide an aircraft to serve as a personnel carrier and which may take-off from and land in a limited space.

Another object is to provide a vertical take-off aircraft of low cost, capable of carrying one person.

A further object of the invention is to provide a vertical take-off aircraft which provides adequate control features to permit flight therein after a comparatively short period of instruction.

Other objects and many of the attendant advantages of this invention will be readily appreciated as the same becomes better understood by reference to the following detailed description when considered in connection with the accompanying drawings wherein.

Figure 1:
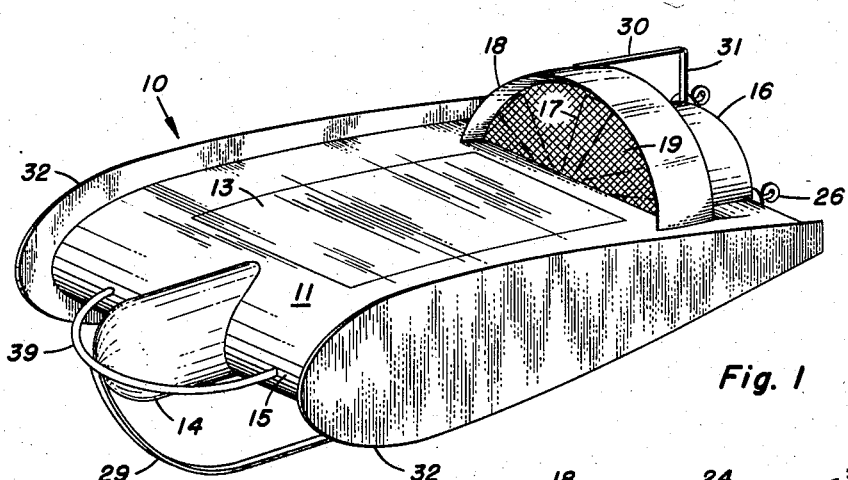
Fig. 1 is a perspective view of a preferred embodiment of the invention.
Figure 3:
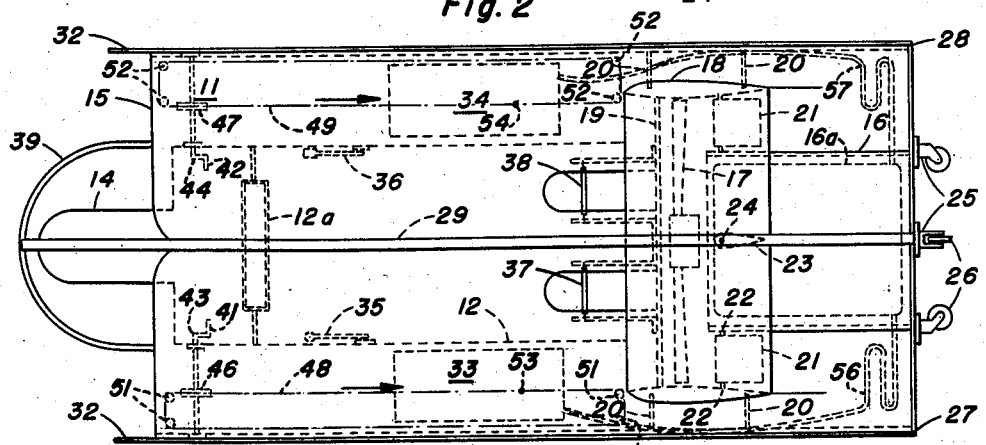
Fig. 3 is a bottom view of the device shown in Fig. 1.

Referring now to the drawings, wherein like reference characters designate like or corresponding parts throughout the several views, there is shown a vertical take-off aircraft 10 having an airfoil shaped body 11 in which there is an occupant compartment 12. This compartment 12 may be upholstered as desired, for the pilot's comfort. A safety belt 12a is provided in the compartment 12. Access to the compartment 12 is by a removable section 13 on the back, upper portion of the body 11, as shown in Fig. 1. A transparent thimble like head shield 14 extends forwardly of the leading edge 15 of the body 11. At the rear of the aircraft 10 there is an engine compartment 16 in which there is an engine 16a which drives a propeller 17. Surrounding the propeller 17 is a shroud 18, to increase the aerodynamic efficiency of the propeller 17. Preferably, propeller 17 has six blades, as shown in Fig. 1. Just ahead of the propeller 16 is a grid 19, also used to increase the efficiency of the propeller 17. The shroud 18 is structurally connected to the body 11 by supports 20, four of which are shown in Fig. 3. Other propulsive means, such as a turboprop engine, a jet engine or a rocket engine, may be used instead of the engine and propeller arrangement shown.

Within shroud 18, in the slipstream of propeller 17, are positioned four moveable control surfaces; two elevons 21 rotatable about shafts 22 and two rudders 23 rotatable about shafts 24. The actuating means for these control surfaces will be referred to hereinafter.

Figure 2:
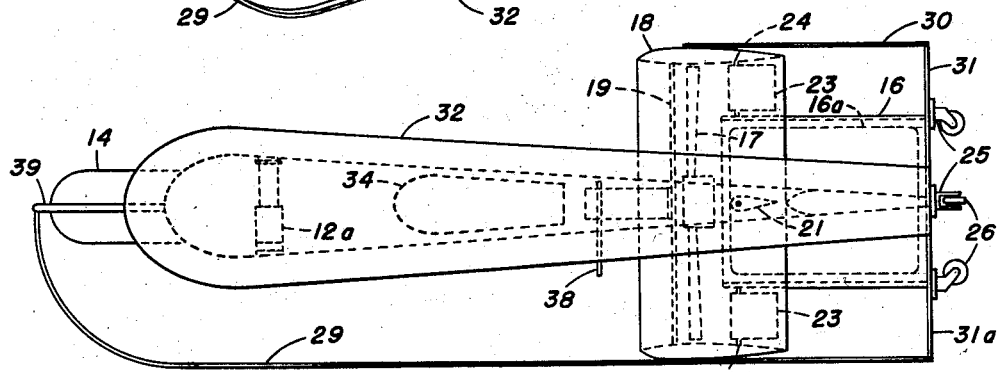
Fig. 2 is a side view of the device shown in Fig. 1.

Emergency landing skid 29 passes beneath the body 11, as shown in Fig. 2, is attached to shroud 18, and at the forward end of the aircraft curves upwardly to support 39, which may conveniently be semi-circular, and which serves, in some measure, to protect the head of the pilot in head shield 14. Aft of engine compartment 16 there is fixed a landing gear comprising four legs 25 supporting wheels 26. An outrigger 30, braced by support 31 extends from shroud 18. The outer trailing edges 27, 28 of the airfoil body 11 may serve as outriggers, as may the aft end of emergency landing skid 29 braced by support 31a.

The body 11 of the aircraft is in the shape of an airfoil, as noted above. The body 11 may conveniently be made of Fiberglas, or other light weight, high strength sheet material. On the ends of airfoil body 11 are positioned end plates 32, which are used to increase the aerodynamic efficiency of the airfoil. Within the airfoil body 11 are two gas tanks, 33 and 34. These gas tanks are moveable, and are subject to adjustment by the pilot by any conventional means. For example, the tanks may slide on tracks (not shown) in body 11, and be moved by handles 41, 42 of cranks 43, 44 protruding into pilot compartment 12. Rotation of cranks 43, 44 will rotate sprockets 46, 47 and produce longitudinal movement of chains 48, 49 engaged with these sprockets. Chains 48, 49 will thereby be moved about sheaves 51, 52 and produce a linear change of position of tanks 33 and/or 34 (as the case may be), these tanks being attached to the chains at 53, 54. In order to supply fuel from these movable tanks to the engine 16a in engine compartment 16 they are provided with flexible hoses 56, 57.

Also in compartment 12 are a throttle control lever 35 and a rudder control lever 36. Lever 36 is attached to rudders 23 by appropriate linkage. Elevons 21 are controlled by appropriate linkage operated by rotation of control pedal plates 37, 38 upon which the feet of the pilot are placed.

In operation, the pilot enters compartment 12 through removable section 13, which is then replaced. His head will be within the head shield 14 and his feet will be on pedal plates 37, 38. The engine 16a in engine compartment 16 is started, and causes propeller 17 to rotate, producing an upwardly directed thrust force. As thrust is increased upon actuation of throttle control lever 35, the force of gravity will be overcome and the craft will rise. Thereafter, elevons 21 will bring the craft to horizontal flight. The propeller 17 will continue to produce thrust, and the airfoil-shaped body 11 will produce lift to sustain the craft. If necessary, the gas tanks 33 and 34 may be adjusted to trim the plane in flight. To land, the air speed will be decreased, the plane caused to assume a vertical, tail down attitude, and the craft lowered by decreasing the thrust of the propeller.

Should the engine fail in horizontal flight, the plane may be glided to a landing on the emergency landing skid 25.

Obviously many modifications and variations of the present invention are possible in the light of the above teachings. It is therefore to be understood that within the scope of the appended claims the invention may be practiced otherwise than as specifically described.

What is claimed is:

1. An aircraft comprising an airfoil-shaped fuselage, a pilot's compartment within said fuselage, said compartment being relatively long, flat and narrow, the longitudinal axis of said compartment lying chord-wise of said fuselage and the transverse axis lying span-wise thereof, whereby a pilot may occupy said compartment in the reclining position with his head adjacent the leading edge of said fuselage, a single engine and a single propeller at the rear of said fuselage, a transparent thimble-like member protruding forwardly of the leading edge of said airfoil shaped fuselage and communicating with said compartment, said member being adapted to contain the head of a pilot occupying said compartment and a semi-circular guard member lying in the plane of said airfoil-shaped fuselage and encompassing said thimble-like member, the ends of said guard member being affixed to said fuselage one end to each side of said thimble-like member.

2. An aircraft comprising an airfoil-shaped fuselage, a pilot's compartment within said fuselage, said compartment being relatively long, flat and narrow, the longitudinal axis of said compartment lying chord-wise of said fuselage and the transverse axis lying span-wise thereof, whereby a pilot may occupy said compartment in the reclining position with his head adjacent the leading edge of said fuselage, a single engine and a single propeller at the rear of said fuselage, a transparent thimble-like member protruding forwardly of the leading edge of said airfoil-shaped fuselage and communicating with said compartment, said member being adapted to contain the head of a pilot occupying said compartment, a semi-circular guard member lying in the plane of said airfoil-shaped fuselage and encompassing said thimble-like member, the ends of said guard member being affixed to said fuselage one end to each side of said thimble-like member, a skid joined to said guard member extended under said fuselage and affixed thereto.

3. An airplane comprising an airfoil shaped fuselage, a relatively long, flat and narrow pilot's compartment in said fuselage and located centrally span-wise thereof, thrust producing means rearwardly of said compartment, a pair of fuel tanks located in said fuselage, one on either side of said compartment being flexibly connected to supply fuel to said thrust producing means, means mounting said tanks for longitudinal movement in said fuselage, and means accessible to said pilot to move said tanks.

4. A vertical takeoff and landing aircraft of minimum longitudinal dimension, comprising, an airfoil-shaped fuselage having a maximum thickness slightly greater than that necessary to accommodate a pilot within it in the reclining position; end plates on said fuselage extending along the sides of said fuselage in a chordwise direction; said plates projecting above, below and ahead of said fuselage; a pilot's compartment in the forward section of said fuselage having throttle, aileron and rudder controls therein; said compartment terminating at its forward end in a rounded capsule of transparent material extending beyond the leading edge of the fuselage for accommodating the pilot's head whereby maximum vision is provided and the required length of the fuselage is reduced; a propeller mounted in the fuselage directly aft of said pilot's compartment for pusher-type propulsion, said propeller being shielded forwardly by a grid and being encased within a shroud; elevator and rudder control surfaces arranged on said fuselage adjacent said propeller and within said shroud, whereby said control surfaces are directly in the concentrated slipstream of the propeller and thereby are highly responsive to enable sensitive control of the aircraft, said control surfaces being operatively connected to said aileron and rudder controls; an engine compartment in said fuselage aft of said propeller and adjacent thereto, the aft end of said engine compartment serving as the normal landing platform for said aircraft; rollers on the aft end of said engine compartment; means in said engine compartment for driving said propeller; outrigger means attached between the aft end of said engine compartment and said fuselage; a semi-circular protective guard member for said capsule; each end of said guard member being attached to the leading edge of said fuselage and its central section being attached to the forward extremity of said capsule; an emergency landing skid extending the length of said fuselage; said skid being attached at its forward end to said guard member at its juncture with said capsule and being attached at its aft end to the aft end of said engine compartment by means of a brace; a fuel tank to each side of said fuselage between said pilot's compartment and the respective end plates; said tanks being mounted for reciprocal movement parallel to the longitudinal axis of said fuselage, means operable from said pilot's compartment for moving said tanks whereby said aircraft may be trimmed to provide aerodynamic stability in lateral flight.

References Cited in the file of this patent

UNITED STATES PATENTS

| | | |
|---|---|---|
| 2,123,657 | Munk | July 12, 1938 |
| 2,419,780 | Jordan | Apr. 29, 1947 |
| 2,431,293 | Zimmerman | Nov. 18, 1947 |
| 2,481,379 | Zimmerman | Sept. 6, 1949 |
| 2,504,137 | Lewis | Apr. 18, 1950 |
| 2,561,291 | Rethorst | July 17, 1951 |
| 2,660,383 | Feeney et al. | Nov. 24, 1953 |
| 2,712,420 | Amster et al. | July 5, 1955 |

FOREIGN PATENTS

| | | |
|---|---|---|
| 559,793 | France | Nov. 26, 1924 |
| 623,885 | Great Britain | May 24, 1949 |